(12) United States Patent
Fujikura et al.

(10) Patent No.: US 11,894,793 B2
(45) Date of Patent: Feb. 6, 2024

(54) CONTROL DEVICE AND CONTROL SYSTEM

(71) Applicant: Mitsubishi Electric Corporation, Tokyo (JP)

(72) Inventors: Shohei Fujikura, Tokyo (JP); Taiga Komatsu, Tokyo (JP); Hiroyuki Higashino, Tokyo (JP); Yuki Hidaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 308 days.

(21) Appl. No.: 17/435,702

(22) PCT Filed: Mar. 15, 2019

(86) PCT No.: PCT/JP2019/010932
§ 371 (c)(1),
(2) Date: Sep. 2, 2021

(87) PCT Pub. No.: WO2020/188650
PCT Pub. Date: Sep. 24, 2020

(65) Prior Publication Data
US 2022/0158582 A1    May 19, 2022

(51) Int. Cl.
*H02K 11/21*  (2016.01)
*H02P 29/60*  (2016.01)
(Continued)

(52) U.S. Cl.
CPC ............... *H02P 29/60* (2016.02); *G01K 3/14* (2013.01); *G01K 13/00* (2013.01)

(58) Field of Classification Search
CPC .......... H02P 29/60; G01K 3/14; G01K 13/00; H02K 11/21
See application file for complete search history.

(56) References Cited

U.S. PATENT DOCUMENTS

| | | | |
|---|---|---|---|
| 8,255,075 B2* | 8/2012 | Ou ...................... | G05B 19/404 374/45 |
| 2003/0076064 A1* | 4/2003 | Kleinau ................ | G05B 13/04 374/E7.042 |
| 2015/0048772 A1* | 2/2015 | Nagata ................. | H02K 11/21 318/634 |

FOREIGN PATENT DOCUMENTS

| | | |
|---|---|---|
| JP | 2002-238283 A | 8/2002 |
| JP | 2002-300799 A | 10/2002 |

(Continued)

OTHER PUBLICATIONS

International Search Report and Written Opinion dated May 28, 2019, received for PCT Application PCT/JP2019/010932, Filed on Mar. 15, 2019, 12 pages including English Translation.

(Continued)

*Primary Examiner* — Cortez M Cook
(74) *Attorney, Agent, or Firm* — XSENSUS LLP

(57) ABSTRACT

A control device that can prevent the deterioration of temperature estimation accuracy in a rotating electric machine due to its aging deterioration is provided. The control device (10) includes a correction unit (13) to correct at least one of thermal resistance, heat generation, and thermal capacity, which are physical quantities to build a thermal circuit model (30-1) covering a thermal circuit of a rotating electric machine (1), wherein the correction unit (13) corrects at least one of the thermal resistance, the heat generation, and the thermal capacity at a measurement position by using measurement information including temperature (T31) or thermal flow (U32) measured by a sensing unit (8) at the measurement position in the rotating electric machine (1).

10 Claims, 14 Drawing Sheets

(51) Int. Cl.
*G01K 3/14* (2006.01)
*G01K 13/00* (2021.01)

(56) References Cited

FOREIGN PATENT DOCUMENTS

| | | |
|---|---|---|
| JP | 2006-50746 A | 2/2006 |
| JP | 2006-296197 A | 10/2006 |
| JP | 2007-112188 A | 5/2007 |
| JP | 2015-116021 A | 6/2015 |
| JP | 2016-82698 A | 5/2016 |

OTHER PUBLICATIONS

Office Action dated Sep. 7, 2023 in Chinese Patent Application No. 201980093787.1, 18 pages.

* cited by examiner

CONTROL DEVICE AND CONTROL SYSTEM

CROSS-REFERENCE TO RELATED APPLICATION

The present application is based on PCT filing PCT/JP2019/010932, filed Mar. 15, 2019, the entire contents of which are incorporated herein by reference.

TECHNICAL FIELD

This application relates to a control device that performs temperature estimation of a rotating electric machine, and a control system including the control device.

BACKGROUND TECHNOLOGY

Some conventional control devices include a temperature detection device that detects the temperature of the motor stator and a temperature estimation device that estimates the temperature of the motor stator. The temperature estimation device estimates the temperature of the motor stator on the basis of a thermal circuit model. The model is composed of the thermal resistances and the heat generations inside the motor, and represents the thermal characteristics of the actual motor, which is a rotating electric machine. It is known that, in such a conventional control device, the heat generation of the motor is corrected by using a product which is obtained by multiplying an error by a predetermined coefficient, the error being between the detected temperature of the stator obtained by the temperature detection device and the estimated temperature of the stator obtained by the temperature estimation device (for example, Patent Document 1).

PRIOR ART LITERATURE

Patent Document

[Patent Document 1]
Unexamined Patent Application Publication JP, 2016-082698, A

SUMMARY OF THE INVENTION

Problems to be Solved by the Invention

In the control device shown in Patent Document 1, the values of thermal resistances and thermal capacities of the thermal circuit model used for temperature estimation need to be fixed by the time of writing the control logic to the control device in the production process. Then the values of the thermal resistances and the thermal capacities of the thermal circuit model are not to be changed after shipment from the factory. Therefore, it is not possible to correct the thermal resistances, the heat generations, and the thermal capacities given in the thermal circuit model according to the actual changes of the thermal resistances, the heat generations, and the thermal capacities of the motor due to their aging deterioration, which causes the accuracy of the temperature estimation of the control device to get worse after the deterioration over time.

The object of the present invention is to solve the above-mentioned problem and to provide a control device which is able to avoid the deterioration of the accuracy of the temperature estimation after the deterioration over time.

Solution to the Problem

A control device according to the application includes
a correction unit to correct at least one of thermal resistance, heat generation, and thermal capacity, which are physical quantities to build a thermal circuit model covering a thermal circuit of a rotating electric machine,
wherein the correction unit corrects, using measurement information, at least one of the thermal resistance, the heat generation, and the thermal capacity whose position corresponds to a measurement position where a sensing unit measured temperature or thermal flow, which is included in the measurement information, in the rotating electric machine.

Advantageous Effects of the Invention

The control device with above-mentioned configuration is able to avoid deterioration in accuracy of the temperature estimation after the deterioration over time.

BRIEF DESCRIPTIONS OF THE DRAWINGS

EMBODIMENTS

Figure 1:
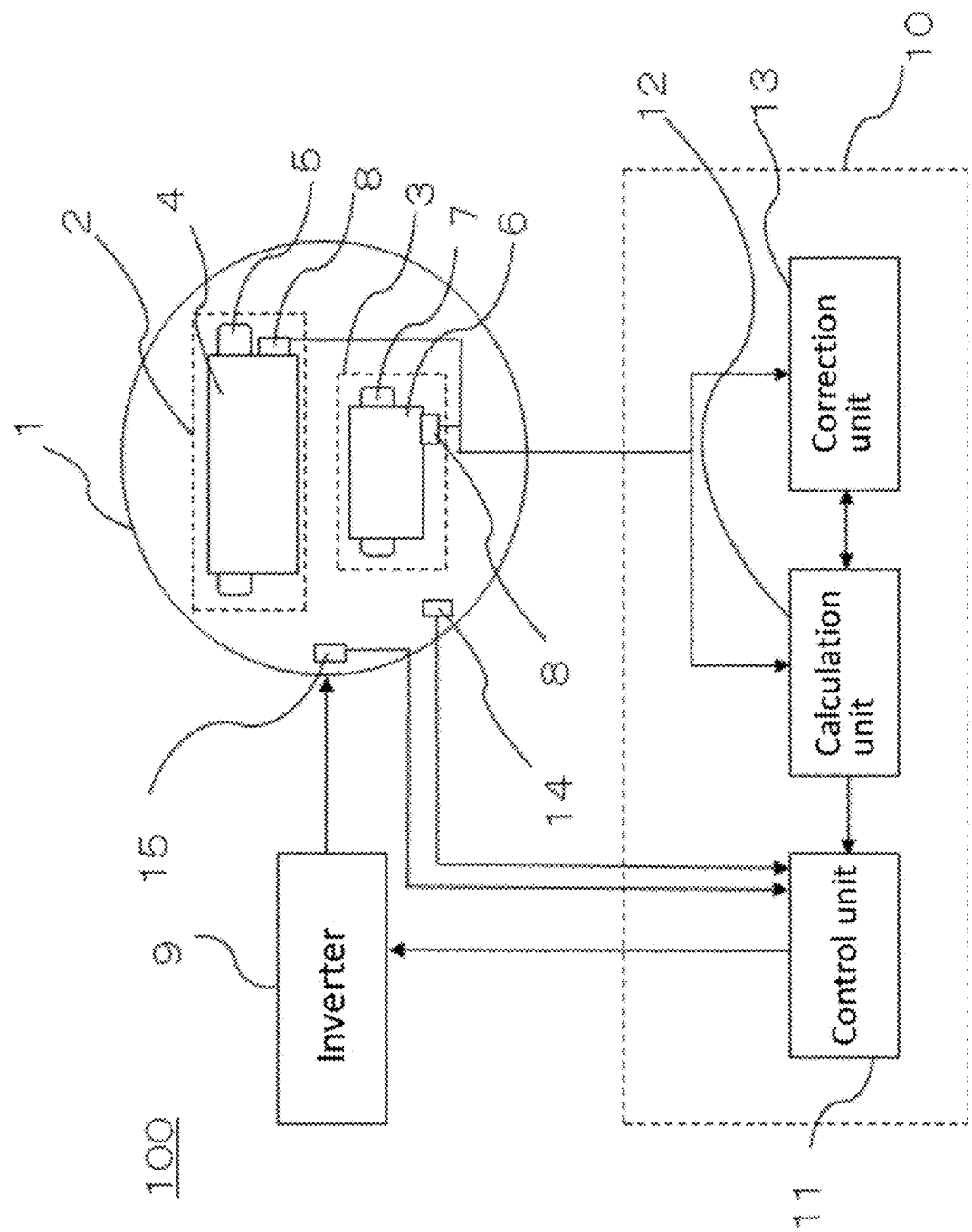
FIG. 1 is a block diagram showing a control system according to Embodiment 1 of this application.

Hereinafter, drive control devices according to the embodiments of this application are described in detail by referring to the drawings.

Embodiment 1

FIG. 1 is a block diagram showing a control system according to Embodiment 1 of the present invention disclosed in this application.

As shown in FIG. 1, a control system 100 includes a motor 1, which is a rotating electric machine, an inverter 9, which is a power converter, a control device 10 that controls the inverter 9, sensors 8, which are sensing units, a rotational position detector 14, and a current detector 15. The control system 100 shown in FIG. 1, which is a motor system, drives a motor mounted on an electric vehicle through an inverter and by a control device, for example. The control device 10 may be integrated with the inverter 9 inside it.

The motor 1 includes a stator 2 and a rotor 3, the rotor 3 being disposed facing the stator 2 with a gap to be able to rotate. The stator 2 includes a stator core 4 and a stator winding 5. The rotor 3 includes a rotor core 6, a rotor winding 7, and a shaft 23. The rotor 3 may include a permanent magnet instead of the rotor winding 7 to produce a magnetic field.

The sensors 8, which are temperature sensors and thermal flux sensors, are provided to the stator 2 and the rotor 3 near the stator winding 5, at the stator core 4, and near the rotor winding 7. They measure local temperatures and thermal flows in the motor 1. The place to mount a sensor 8 on is not limited to the inside of the motor 1. It is possible to place it at another position of the motor 1, such as the outer surface thereof. Further, the sensor 8 does not necessarily have to be installed in or on the motor 1. It may be provided at a position separate from the motor 1 so long as it can measure temperatures and thermal flux of the motor 1. Note that the sensor 8 is not limited to a temperature sensor or a thermal flux sensor, but may be a type of sensor that obtains information which allows us to indirectly know the temperature and the thermal flux.

In addition, the motor 1 is provided with a rotational position detector 14 that detects the rotational position of the rotor 3 and a current detector 15 that detects the current flowing through the motor 1 as a detected current.

The control device 10 includes a control unit 11 to control the motor 1 using a thermal circuit model covering the thermal circuit of the motor 1, which is a rotating electric machine, a calculation unit 12 to estimate the temperature of the rotating electric machine as an estimated temperature using the thermal circuit model, and a correction unit 13 to correct at least one of the thermal resistance, the heat generation, and the thermal capacity, which are the physical quantities to constitute the thermal circuit model.

The calculation unit 12 and the correction unit 13 receive the measurement information acquired by the sensors 8 provided for the motor 1 and perform the calculation described later.

The control unit 11 receives correction information, which is the result of the correction, from the correction unit 13, the rotational position of the motor 1 from the rotational position detector 14, and the detected current from the current detector 15, and then calculates a voltage instruction using a current instruction, which is generated on the basis of the correction information and the rotational position, and the detected current to send it as an output to the inverter 9.

The inverter 9 applies a voltage to the motor 1 on the basis of the voltage instruction. For example, the inverter 9 drives the motor 1 by applying a voltage to the motor 1, the voltage being modulated with the PWM waveform generated on the basis of the voltage instruction.

As a result, the control device 10 can control the voltage to be applied to the motor 1 so as for the detected current to be detected by the current detector 15 to follow the current instruction. Thus, the control device 10 controls the output of the motor 1 by changing the way the motor 1 works, specifically the torque or the rotational speed thereof.

Figure 2:
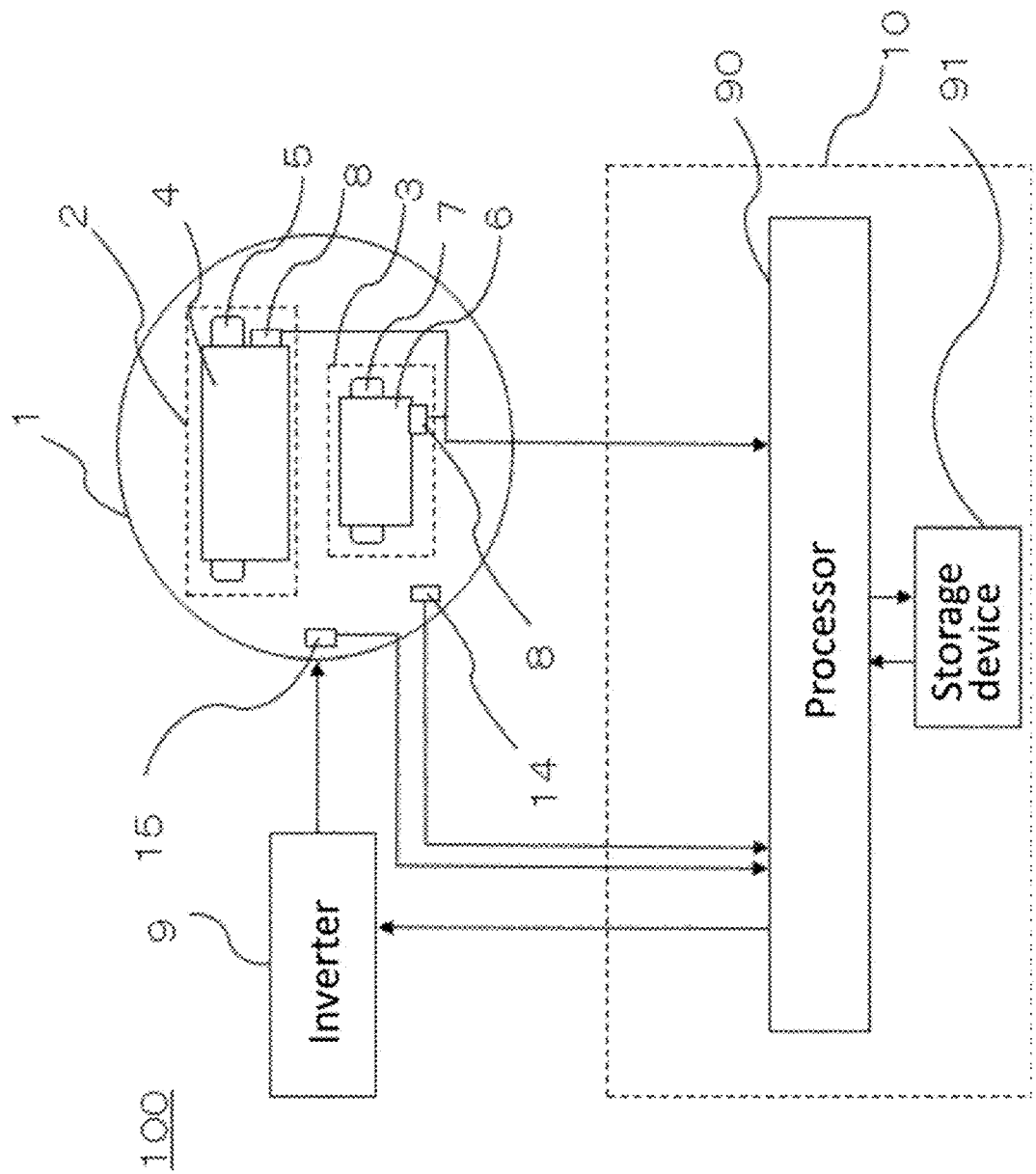
FIG. 2 is a hardware configuration diagram showing the control system according to Embodiment 1 of this application.

FIG. 2 is a hardware configuration diagram showing the control system according to the present embodiment. As shown in FIG. 2, the control device 10 used in the control system 100 includes a processor 90 and a storage device 91. The processor 90 executes a program stored in the storage device 91 to perform the processing of the control device 10.

The processor 90 includes a processor logically configured as a hardware circuit such as a microcomputer, a digital signal processor (DSP), and an FPGA.

The storage device 91 includes a volatile storage such as a random access memory and a non-volatile auxiliary storage such as a flash memory, both not shown. Further, the storage device 91 may include a volatile storage such as a random access memory and an auxiliary storage such as a hard disk instead of the non-volatile auxiliary storage, both not shown.

The processor 90 executes a program loaded from the storage device 91. Since the storage device 91 includes the auxiliary storage and the volatile storage, the program is loaded from the auxiliary storage into the processor 90 via the volatile storage. The processor 90 can send its output data such as a calculation result to the volatile storage of the storage device 91 or can save the data in the auxiliary storage via the volatile storage.

The functions of the control unit 11, the calculation unit 12, and the correction unit 13 (the units shown in FIG. 1) are realized by the processor 90 that executes the program stored in the storage device 91 or by a processing circuit such as a system LSI (not shown). It is also possible for a plurality of the processors 90 and the storage devices 91 or for a plurality of the processing circuits to cooperatively realize the above functions. In addition, it is possible for a combination of a plurality of the processors 90 with a plurality of storage devices 91 and a plurality of the processing circuits to cooperatively realize the above functions.

Next, the way the device of the present embodiment works is described.

Figure 3:
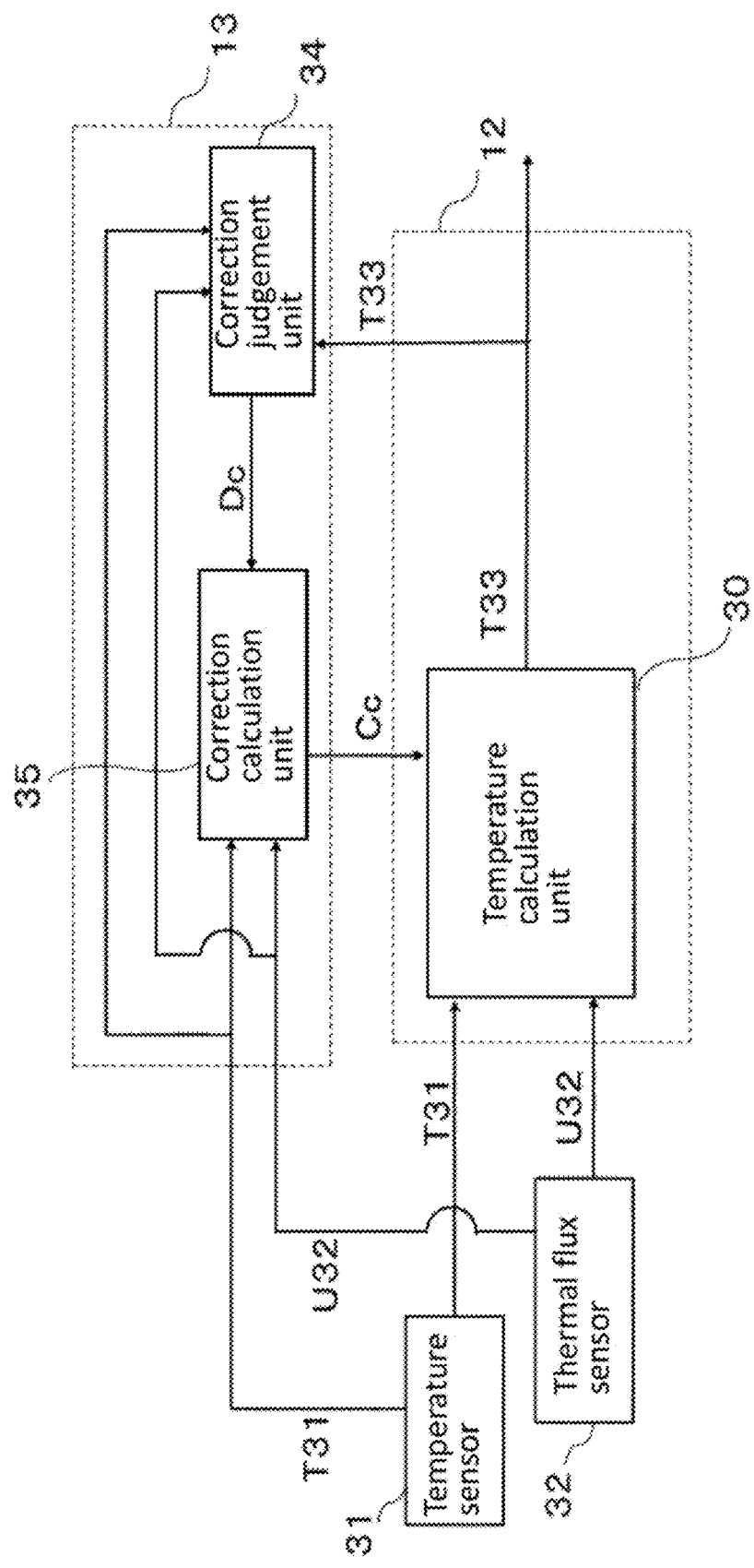
FIG. 3 is a block diagram showing a part of the control device according to Embodiment 1 of this application.

FIG. 3 is a block diagram showing a part of the control device according to the present embodiment. The calculation unit 12 of the control device 10 includes a temperature calculation unit 30 which estimates the temperature distribution of the motor 1 on the basis of the thermal circuit model to make its output of the estimated temperature T33. The estimation is performed using a measured temperature T31, which is the measurement information measured by a temperature sensor 31, which is a sensor 8, a measured thermal flow U32, which is the measurement information measured by a thermal flux sensor 32, which is a sensor 8, and a correction information Cc, which is the output of the correction unit 13. The thermal circuit model is a model composed of a thermal network including a thermal circuit represented by a thermal circuit equation based on Ohm's law.

In the present embodiment, the measured temperature T31 is measured temperature of the temperature sensor st2, and the measured thermal flows U32 are measured thermal flows of the thermal flux sensors sf1 and sf3. There may be a plurality of the measured temperatures T31 and the measured thermal flows U32, which are each measured by the sensors 8.

The correction unit 13 includes a correction judgment unit 34 which judges the necessity of correction of the thermal circuit model and includes a correction calculation unit 35 which sends its output of the correction information Cc for a partial thermal circuit model, which is a part of the thermal circuit model that is necessary for the correction.

The correction judgment unit 34 determines the necessity of the correction using the estimated temperature T33, which is the output from the temperature calculation unit 30, and the measured temperature T31 or the measured thermal flow U32, and sends its output of the correction instruction Dc if needed. The temperature sensor 31, which is a sensor 8, measures, as a measured temperature, the temperature at a measurement position where the estimated temperature T33 is calculated. The thermal flux sensor 32, which is a sensor 8, measures, as a measured thermal flow, the thermal flow of a measurement position where the estimated temperature T33 is calculated.

The correction calculation unit 35 corrects, on the basis of the partial thermal circuit model, at least one of the thermal resistance, the heat generation, and the thermal capacity at the measurement position to send its output of the correction information Cc. The correction is performed by using the correction instruction Dc, the measured temperature T31, and the measured thermal flow U32, in other words, by using the measurement information including the temperature or the thermal flow, measured by the sensor 8, at the measurement position in the motor 1. The partial thermal circuit model includes the measurement position of the sensor 8.

The correction unit 13 may also correct, by using a plurality of the measured temperatures T31 measured by the plurality of the sensors 8 provided to the motor 1, at least one of the thermal resistance, the heat generation, and the thermal capacity for each of measurement positions, the measurement positions being positions where the measured temperatures T31 are measured by the sensors 8.

Figure 4:
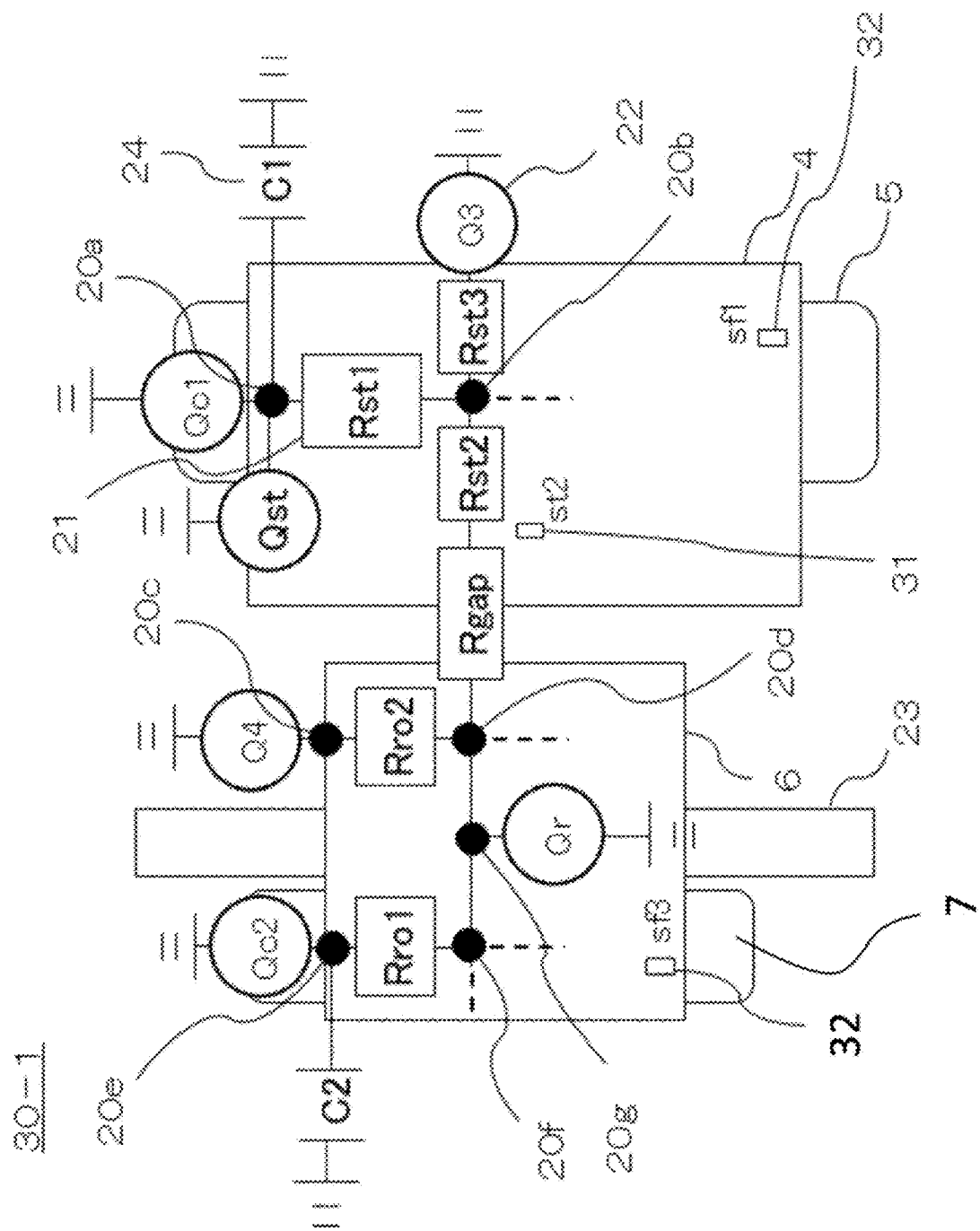
FIG. 4 is a diagram showing a thermal circuit model of an entire motor to be used for temperature estimation by the control device according to Embodiment 1 of this application.

Next, the thermal circuit model is described by referring to FIG. 4.

FIG. 4 is a diagram showing a thermal circuit model of the entire motor to be used for temperature estimation by the control device according to the present embodiment. The thermal circuit model 30-1 of FIG. 4 includes spatial thermal flux elements and spatial temperature elements that represent the entire motor 1 together as a thermal circuit, which includes one or more of each of a node 20, a thermal resistance 21, a heat source 22, and a thermal capacity 24.

Each of the nodes 20 such as the node 20b in FIG. 4 represents a specific position of the motor 1 including its inside. Each of the nodes 20 has, in the model, the temperature T of its position.

The thermal resistance 21 represents how difficult for the heat to flow. The thermal resistance is included in each of the partial thermal circuits for the motor 1. Examples of the thermal resistance 21 are Rst1, Rst2, . . . , Rro1, Rro2, . . . etc. in FIG. 4. The thermal flows U flow through their respective thermal resistances 21.

The heat "generations" Q in FIG. 4 include the heat generation Qc1 due to copper loss caused by energizing the stator winding 5, the heat generation Qc2 due to copper loss caused by energizing the rotor winding 7, the heat flows Q3, Q4 which are heats flowing in from the outside of the motor 1, and the heat generations Qst, Qr due to iron loss which occur in the stator core 4 and the rotor core 6. They "are" quantities of heats flowing in from their respective heat sources 22.

The thermal capacity 24 represents how easily the temperature rises. It is connected to at least one of the nodes 20. The thermal circuit model 30-1 is a combination of model elements such as the nodes 20, the thermal resistances 21, the heat sources 22, and the thermal capacities 24. It is not limited to a two-dimensional model. A thermal circuit model whose elements are three-dimensionally connected can also be built. To improve the accuracy of the temperature estimation, a model in which more nodes 20 are placed at higher density to be connected to the thermal resistances 21, the heat sources 22, and the thermal capacities 24 may be built.

In FIG. 4, the motor 1 has vertical symmetry about the horizontal plane dividing the motor shaft in its middle, so that only minimum thermal circuit model elements are shown. However, the thermal circuit actually has its bottom half below the dotted lines. Be careful that the thermal circuit model 30-1 of FIG. 4 is not the one with its detail. The actual one has further details about, for example, placements of the nodes 20 and the thermal resistances 21, etc. A more detailed thermal circuit is described later by referring to FIG. 5. In the thermal circuit model 30-1, the temperature sensor st2 is disposed at a position in the middle along the shaft direction of the stator core and the thermal flux sensors sf1 and sf3 are disposed near the stator winding 5 and the rotor winding 7, respectively. The temperature sensor st2 measures the temperature at its installed measurement position, and the thermal flux sensors sf1 and sf3 measure the thermal flows at their respective measurement positions. Here, the thermal flux sensors sf1 and sf3 measure the thermal flux at their respective measurement positions and each of them calculates the product of its measured thermal flux and the measurement area of the thermal flux sensor, sf1 or sf3, to send the calculated product as its output of a measured thermal flow.

Here, the measurement position, at which a sensor 8 is to obtain the data, matches the position where the sensor 8 is installed. However, the measurement position from which the sensor 8 obtains the data does not need to match the position where the sensor 8 is placed. It is possible for a sensor 8 to be placed at a position away from the measurement position to obtain the measurement information of the measurement position without touching the measurement position.

Figure 5:
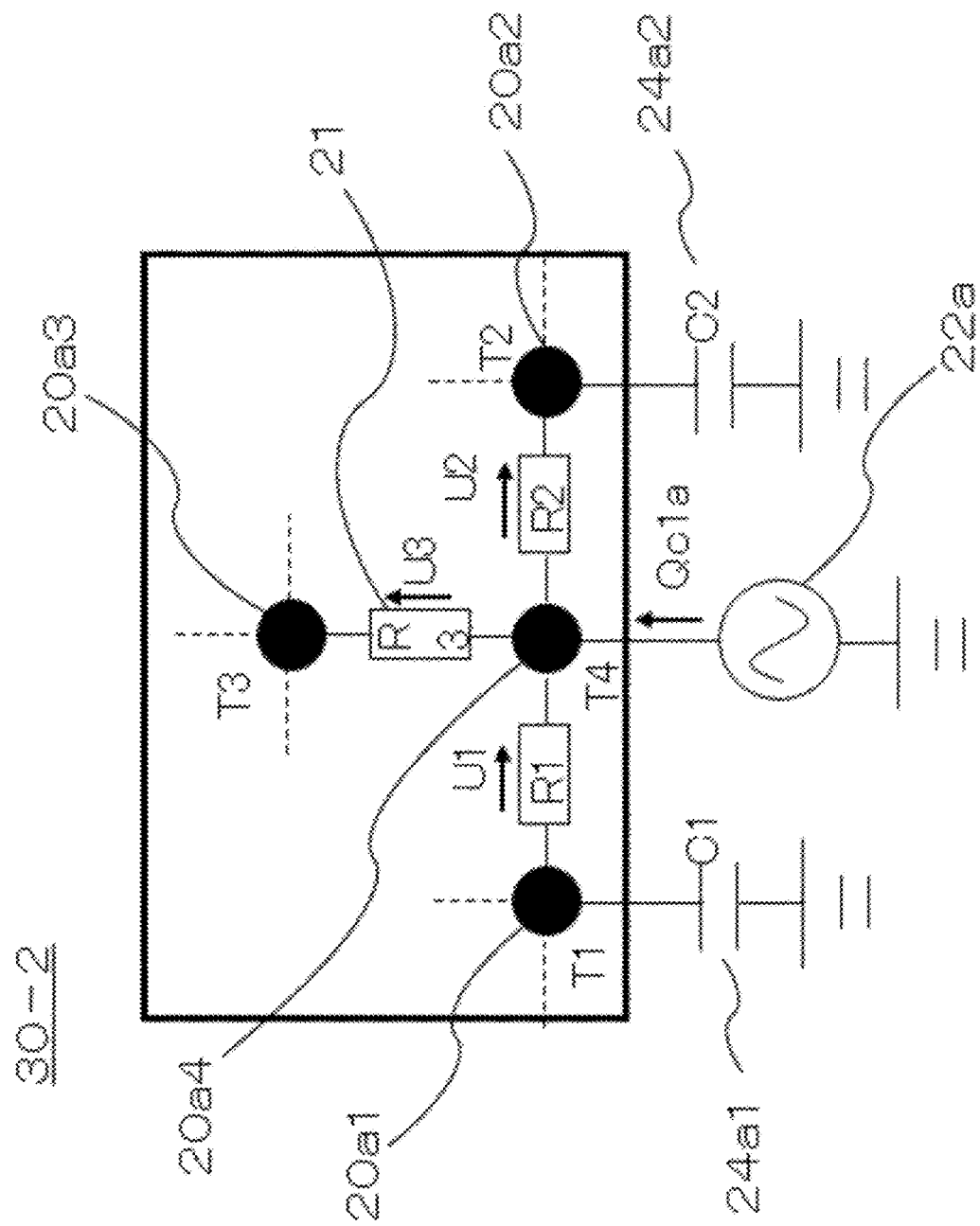
FIG. 5 shows a part of the thermal circuit model shown in FIG. 4.
Figure 6:
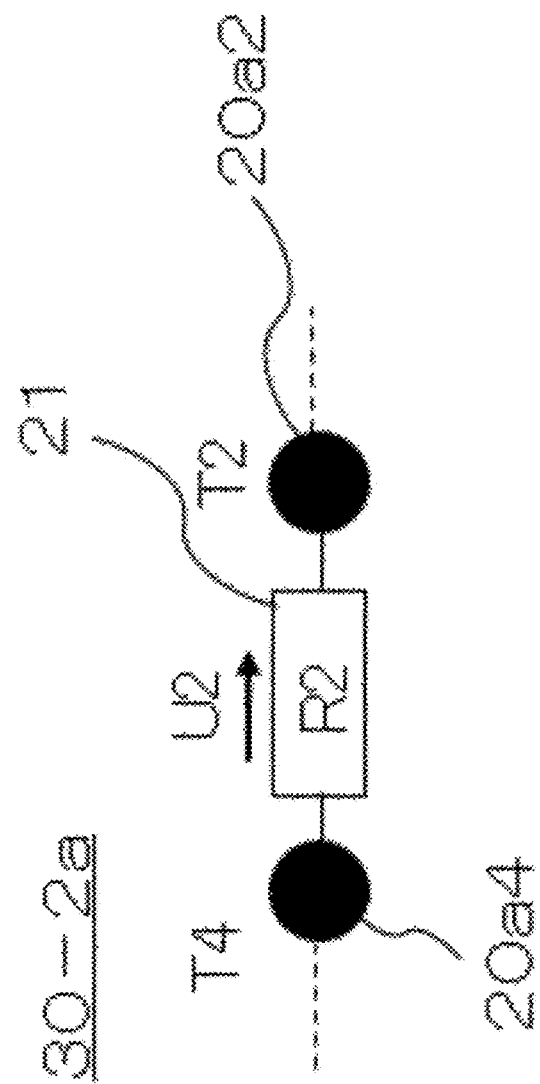
FIG. 6 shows a part of the thermal circuit model for correcting the thermal resistance to be used by the control device according to Embodiment 1 of this application.

Next, the way of the temperature estimation by the calculation unit 12 using the thermal circuit model 30-1 is described by referring to FIGS. 5 and 6.

First, the thermal circuit equations used in the thermal circuit model 30-1 are described by referring to FIG. 5. FIG. 5 shows a partial thermal circuit model 30-2, which is a part of the thermal circuit model 30-1 shown in FIG. 4.

FIG. 5 is a detailed illustration of the thermal circuit model containing the node 20a, the heat generation Qc1a of a heat source 22, and the value C1 of a thermal capacity 24, which are in the thermal circuit model 30-1 of FIG. 4. As shown in FIG. 5, the partial thermal circuit model 30-2 includes four nodes 20a1, 20a2, 20a3, 20a4, three thermal resistances 21a1, 21a2, 21a3, one heat source 22a, and two thermal capacities 24a1, 24a2. The three thermal resistances 21 and the four nodes 20a1, 20a2, 20a3, 20a4 are part of the node 20a of the thermal circuit model 30-1 in FIG. 4. For the partial thermal circuit model 30-2, Equations (1), (2), and (3) hold about the thermal resistances R1, R2, and R3 on the basis of Ohm's law.

$$R_1 = \frac{T_1 - T_4}{U_1} \quad \text{Equation (1)}$$

$$R_2 = \frac{T_4 - T_2}{U_2} \quad \text{Equation (2)}$$

$$R_3 = \frac{T_4 - T_3}{U_3} \quad \text{Equation (3)}$$

In Equations (1), (2) and (3), T1, T2, T3 and T4 are the temperatures at the four nodes 20a1, 20a2, 20a3 and 20a4, respectively; R1, R2 and R3 are each the values of the three thermal resistances 21; U1, U2 and U3 are each the thermal flows at the three thermal resistances 21. Equations (1), (2), and (3) are part of the thermal circuit equations that hold for the partial thermal circuit model 30-2 in FIG. 5. A plurality of such equations hold for the whole thermal circuit model 30-1. Therefore, the thermal circuit equations that hold for the thermal circuit model 30-1 for the entire motor 1 shown in FIG. 4 are expressed as Equation 4.

$$\{\hat{T}_{33}\}^T = F(\hat{R}, \hat{Q})\{T_{31}, U_{32}\}^T \quad \text{Equation (4)}$$

The function F on the right side of Equation (4) is a matrix of functions representing the thermal circuit equations of the thermal circuit model 30-1, where the R represents values of the thermal resistances 21 included in the thermal circuit equations and the Q represents heat generations of the heat sources 22 also included therein. The left side of Equation (4) is a column vector with its elements representing estimated temperatures T33. The $\{T31, U32\}^T$ on the right side of Equation (4) is a column vector with its elements representing measured temperatures T31 and measured thermal flows U32. That is, Equation (4) shows all the thermal circuit equations which hold for the thermal circuit model 30-1. Note here that, a caret mark "^" added over T33, R and Q shows that they are not measured values, but estimated values set in advance. Hence $\hat{T}33$, $\hat{R}$ and $\hat{Q}$ represent estimated temperatures, estimated resistance values, and estimated heat generations, respectively. The T31 and U32 in Equation (4) are substituted by the measured temperatures T31 and the measured thermal flows U32, which are measurement information provided by the temperature sensors 31 and the thermal flux sensors 32, respectively, to solve Equation (4) and to obtain the estimated temperatures T33. Hereinafter, T33 are represented simply by T33.

If the values R of the thermal resistances 21 and the heat generations Q in the thermal circuit model 30 are accurate for the actual values of the thermal resistances 21 and the heat generations in the motor 1, respectively, it is possible to accurately estimate the temperatures T33 using Equation (4). However, the values R of the thermal resistances 21 and the heat generations Q of the motor 1 change because of the aging deterioration or the way the motor is used, so that the errors arise between the values of the thermal resistances 21 in the thermal circuit model 30 and those of the motor 1 and between the heat generations in the thermal circuit model 30 and those of the motor 1. These errors are expected to make accurate estimations of the temperatures T33 difficult. To cope with this problem, the values R of the thermal resistances 21 and the values Q of the heat generations in the thermal circuit model 30 are first set to the values of the estimated resistances $\hat{R}$ and the estimated heat generations $\hat{Q}$ as the factory default values, respectively, to be later corrected by the correction unit 13 using the measurement information sent from the sensors 8 and part of the thermal circuit equations. At this time, it is good to use (Length of thermal flow path)/{(Cross-sectional area of thermal flow path) (Thermal conductivity of parts and materials of the motor 1)} for the estimated thermal resistances $\hat{R}$ as the initial values.

The winding as a heat source 22 generates heat due to its copper loss, so that the estimated heat generation Q as the initial value can be calculated as (Resistance of the winding)×(Square of the current through the winding).

The stator core 4 or the rotor core 6 as a heat source 22 generates heat mainly due to its iron loss. The iron loss is proportional to the square of magnitude of magnetic flux density and the square of frequency thereof. The induced voltage induced by magnetic flux linking the stator winding 5 is (Magnetic flux density)×(Cross-sectional area of magnetic path through which magnetic flux passes)×(Frequency of magnetic flux density). Then, the iron loss is thought to be proportional to the square of the induced voltage of the stator winding 5. Hence, the estimated heat generations $\hat{Q}$ of the stator core 4 and the rotor core 6 can be calculated by (Square of induced voltage of the stator winding 5)×(Proportional coefficient).

The way the thermal resistance in the thermal circuit model 30-1 is corrected is described by referring to FIG. 6.

FIG. 6 shows a part of the thermal circuit model for correcting the thermal resistance to be used by the control device according to the present embodiment. FIG. 6 shows a partial thermal circuit model 30-2a, which is an excerpt from the thermal circuit model 30-1. The partial thermal circuit model 30-2a shown in FIG. 6 includes, for example, the nodes 20a2, 20a4 and the thermal resistance R2, which are taken out from FIG. 5. Regarding the partial thermal circuit model 30-2a, the temperature sensors 31 measure the temperature T2 of the node 20a2 and the temperature T4 of the node 20a4, and the thermal flux sensor 32 measures the thermal flow U2. The value of the thermal resistance 21 is R2. Although the temperature sensors 31 and the thermal flux sensors 32 can be placed at certain positions around or in the motor 1, it is good to place them close to the thermal resistances 21 to be corrected. As an equation for this thermal circuit, Equation (2) shown above holds because of the Ohm's law.

Here the U2 is defined as positive in a case where the heat flows from the node 20a4 whose temperature is T4 to the node 20a2 whose temperature is T2. The correction unit 13 solves Equation (2) using the temperatures T2 and T4 measured by the temperature sensors 31 and the thermal flow U2 measured by the thermal flux sensor 32 to correct the thermal resistance R2, which is the value of the thermal resistance 21 between the node 20a4 and the node 20a2, using the obtained result by solving the equation.

That is, a sensor 8 measures the temperature at the measurement position 20a4 as the measured temperature T4 and a sensor 8 measures the temperature at the measurement position 20a2 as the measured temperature T2, the measurement position 20a4 and the measurement position 20a2 being two different measurement positions on or in the motor 1, while a sensor 8 measures the thermal flow flowing from the measurement position 20a4 to the measurement position 20a2 as the thermal flow U2. Then, the correction calculation unit 35 of the correction unit 13 corrects the thermal resistance R2 between the measurement position 20a4 and the measurement position 20a2 using the difference between the measured temperature T4 and the measured temperature T2 plus the measured thermal flow U2.

As shown here, the thermal resistance R2 can always be corrected on the basis of the measurement information obtained from two temperature sensors 31 and one thermal flux sensor 32 provided near the thermal resistance 21.

Figure 7:
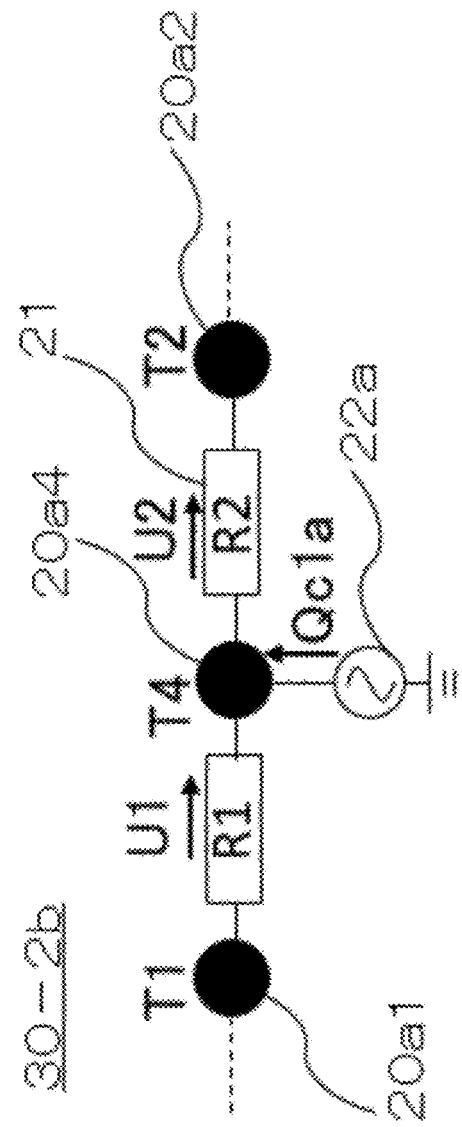
FIG. 7 shows a part of the thermal circuit model for correcting the heat generation to be used by the control device according to Embodiment 1 of this application.

The way the heat generation in the thermal circuit model 30-1 is corrected is described by referring to FIG. 7.

FIG. 7 shows a part of the thermal circuit model for correcting the heat generation to be used by the control device according to the present embodiment. FIG. 7 shows a partial thermal circuit model 30-2b, which is an excerpt from the thermal circuit model 30-1. The partial thermal circuit model 30-2b shown in FIG. 7 includes, for example, three nodes 20a1, 20a2, 20a4, two thermal resistances 21 with thermal resistances R1 and R2, and one heat source 22a, which are taken out from FIG. 5. The temperatures T1, T2, and T4 are measured temperatures measured by the temperature sensors 31. Although the temperature sensors 31 can be placed at certain positions, it is good to place them close to the heat source 22a to be corrected. For this thermal circuit, Equation (5) holds.

$$Q_{c1a} = U_1 - U_2 = \frac{T_1 - T_4}{R_1} - \frac{T_4 - T_2}{R_2} \quad \text{Equation (5)}$$

Here the U1 is defined as positive in a case where the heat flows from the node 20a1 whose temperature is T1 to the node 20a4 whose temperature is T4, while the U2 is defined as positive in a case where the heat flows from the node 20a4 whose temperature is T4 to the node 20a2 whose temperature is T2. R1 is the value of the thermal resistance 21 between the nodes 20a1 and 20a4, and R2 is the value of the thermal resistance 21 between the nodes 20a4 and 20a2. Qc1a is the value of heat generation at the heat source 22a and is defined as positive in a case where the heat flows into the node 20a4 whose temperature is T4. The correction unit 13 solves Equation (5) using the measured temperatures T1, T2, T4 and the known thermal resistances R1, R2 to correct the heat generation Qc1a using the obtained result by solving the equation. The correction of the heat generation Qc1a may be performed using the thermal flows U1, U2 instead of the temperatures T1, T2, T4. In this case, the thermal flows U1 and U2 are measured by the thermal flux sensors 32.

That is, a sensor 8 measures the temperature at the measurement position 20a1 as the measured temperature T1, a sensor 8 measures the temperature at the measurement position 20a4 as the measured temperature T4, and a sensor 8 measures the temperature at the measurement position 20a2 as the measured temperature T2, the measurement positions 20a1, 20a4, and 20a2 being three different measurement positions on or in the motor 1. The correction unit 13 corrects the heat generation Qc1a that flows into or out of the measurement position 20a4 using the measured temperatures T1, T2, T4, the thermal resistance R2 between the measurement position 20a2 and the measurement position 20a4, and the thermal resistance R1 between the measurement position 20a4 and the measurement position 20a1.

This means, the heat generation Qc1a can always be corrected on the basis of the measurement information obtained from two thermal flux sensors 32 provided near the heat source 22a.

A sensor 8 measures the thermal flow at the first measurement position as the measured thermal flow U1, while a sensor 8 measures the thermal flow at the second measurement position as the measured thermal flow U2, the first measurement position being the position between the nodes 20a1 and 20a4, the second measurement position being the position between the nodes 20a4 and 20a2, these two measurement position being two different measurement positions on or in the motor 1. The correction unit 13 corrects the heat generation Qc1a, which is the heat inflow into or the heat outflow from a position between the first measurement position and the second measurement position, using the difference between the measured thermal flow U1 and the measured thermal flow U2.

As shown here, the heat generation Qc1a can always be corrected on the basis of the measurement information obtained from two thermal flux sensors 32 provided near the heat source 22a.

Figure 8:
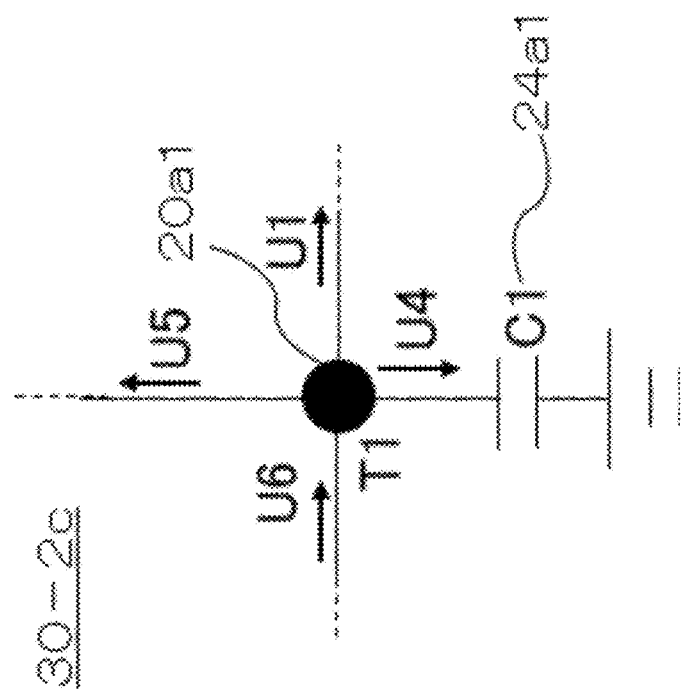
FIG. 8 shows a part of the thermal circuit model for correcting the thermal capacity to be used by the control device according to Embodiment 1 of this application.

The way the thermal capacity in the thermal circuit model is corrected is described by referring to FIG. 8.

FIG. 8 shows a part of the thermal circuit model for correcting the thermal capacity to be used by the control device according to the present embodiment. FIG. 8 shows a partial thermal circuit model 30-2c, which is an excerpt from the thermal circuit model 30-1. The partial thermal circuit model 30-2c shown in FIG. 8 includes, for example, one node 20a1 and one thermal capacity 24a1, which are taken out from FIG. 5. The node 20a1 is an intersection of four thermal flow paths, each of which is a heat flow path of the thermal flow U1, U4, U5, or U6. The temperature T1 of the node 20a1 is the measured temperature measured by a temperature sensor 31. The thermal flows U1, U5, and U6 are measured thermal flows each of which is obtained by a thermal flux sensor 32. For this thermal circuit, Equation (6) holds.

$$C1 = \frac{U_4}{dT} = \frac{U_6 - U_1 - U_5}{dT} \quad \text{Equation (6)}$$

Here the dT is the temperature rise per unit time at the node 20a1, and C1 is the value of the thermal capacity 24a1. The correction unit 13 solves Equation (6) using the measured values U1, U5, U6 obtained by the thermal flux sensors 32 to correct the thermal capacity C1 using the obtained result by solving the equation.

That is, in a case where a sensor 8 measures the temperature rise per unit time at the measurement position 20a1 as the measured temperature rise dT, the measurement position 20a1 being a measurement position on or within the motor 1, and sensors 8 measure three thermal flows as measured thermal flows U1, U5, and U6, these three thermal flows being three thermal flows out of four thermal flows U1, U4, U5, and U6 each of which flows into or flows out of the measurement position 20a1, a thermal flow that is from among the four thermal flows U1, U4, U5, and U6 and which is different from the measured thermal flows U1, U5, and U6 being called a thermal flow U4, the correction unit 13 corrects the thermal capacity C1 where the thermal flow U4 passes using the measured thermal flows U1, U5, and U6 and the measured temperature rise dT.

As shown here, the value C1 of the thermal capacity 24a1 can always be corrected on the basis of the measurement information obtained from one temperature sensor 31 and three thermal flux sensors 32 provided near the thermal capacity 24a1.

The way to correct the thermal resistance, the heat generation, and the thermal capacity are not limited to the way using Equations (2), (5), or (6) shown above. The way of correction using the measurement information obtained by a plurality of the sensors 8 installed around or in the motor 1 and at least part of the thermal circuit equations that hold in the thermal circuit model 30-1 shown in FIG. 4 can be effectively applied to this object.

With the way described above, the correction unit 13 sends information for correcting at least one of the thermal resistance, the heat generation, and the thermal capacity to the calculation unit 12 as its output of the correction information Cc. By referring to the flow chart in FIG. 9, the procedure for the detailed way of correction to be performed by the control device 10 is described.

Figure 9:
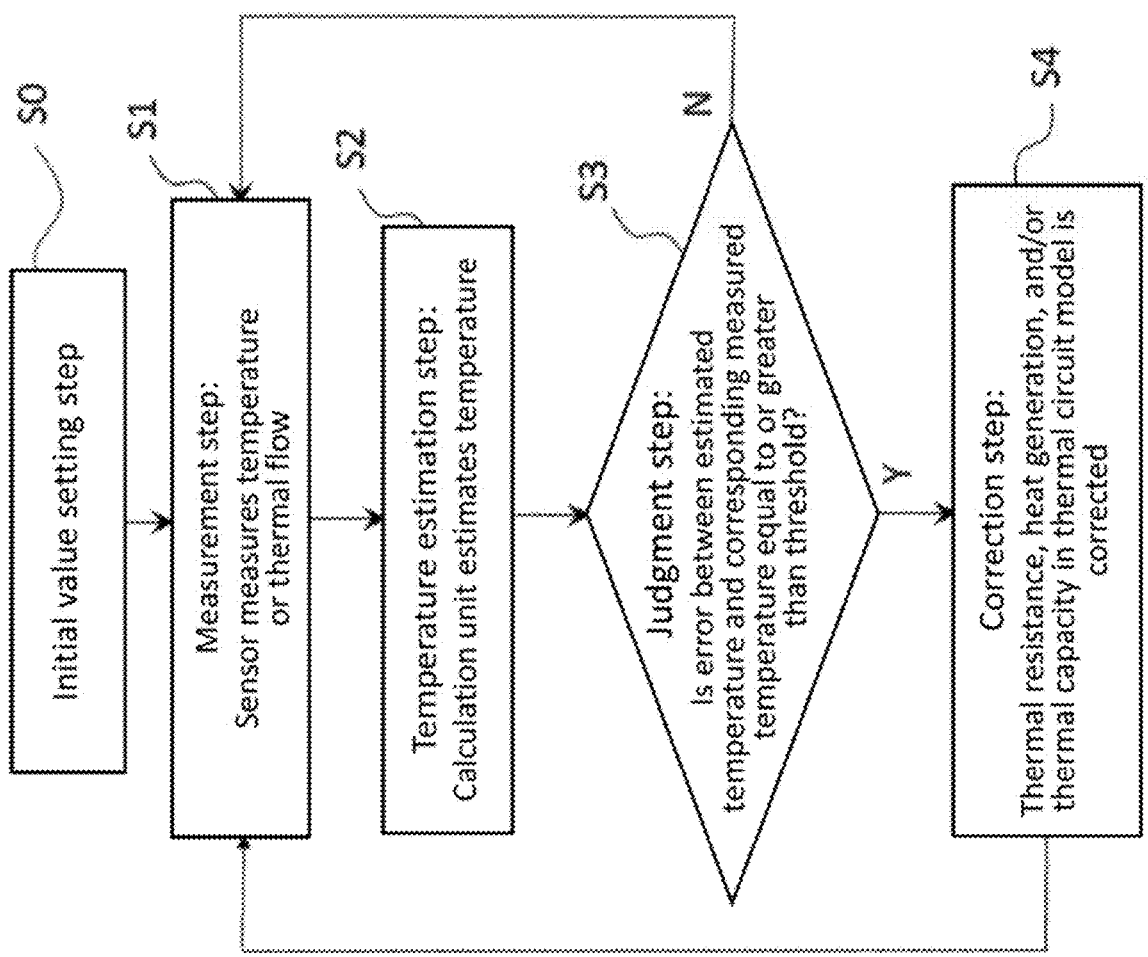
FIG. 9 is a flow chart of a control process performed by the control device according to Embodiment 1 of this application.

FIG. 9 is a flow chart of a control process performed by the control device according to the present embodiment.

In the initial value setting step S0 of FIG. 9, the temperature calculation unit 30 of the calculation unit 12 sets predetermined initial values, each of which is of at least one of the thermal resistance, the heat generation, and the thermal capacity, which are physical quantities to build the thermal circuit model 30-1 to be used by the temperature calculation unit 30 of the calculation unit 12. The initial values may be set, for example, at the time of shipment from the factory, or the correction calculation unit 35 of the correction unit 13 may send its output of the predetermined initial values as the correction information Cc to the temperature calculation unit 30 to set them.

Next, in the measurement step S1 in FIG. 9, the temperature sensors 31 measure the measured temperatures T31, and the thermal flux sensors 32 measure the measured thermal flows U32, each of the temperature sensors 31 and the flux sensors 32 being a sensor 8.

Next, in the temperature estimation step S2 of FIG. 9, the temperature calculation unit 30 of the calculation unit 12 estimates the estimated temperature T33 using the measured temperatures T31 and the measured thermal flows U32 on the basis of the thermal circuit model 30-1. In a case where the correction unit 13 sends its output of the correction information Cc, the temperature calculation unit 30 of the calculation unit 12 estimates the estimated temperature T33 on the basis of the thermal circuit model 30-1 corrected using the correction information Cc.

Next, in the judgment step S3 of FIG. 9, the correction judgment unit 34 of the correction unit 13 in FIG. 3 compares the estimated temperature T33 estimated by the calculation unit 12 with the measured temperature T31 of the same position as the estimated temperature T33. Then, if the error ε between the estimated temperature T33 and the measured temperature T31 is equal to or greater than a preset threshold, the correction judgment unit 34 sends its output of the correction instruction Dc, which is an instruction to instruct the correction, as a correction trigger. In case where the error ε is below the preset threshold, the active step returns to the measurement step S1 and then the step S1 and the temperature estimation step S2 followed by the judgment step S3 are repeated again and again until the error ε becomes equal to or greater than the preset threshold. The preset threshold is determined according to the required accuracy for the temperature estimation. The correction judgment unit 34 sends its output of the correction instruction Dc not only when the motor 1 is not working but also when the motor 1 is producing torque.

In the correction step S4, which is the next step shown in FIG. 9, the correction calculation unit 35 calculates thermal resistances by Equation (2), calculates the heat generations by Equation (5), or calculates the thermal capacities by Equation (6) with receipt of the correction instruction Dc in a case where the error ε is greater than or equal to the preset threshold. Then, the correction calculation unit 35 sends its output of the calculation results, each of which is of at least one of the thermal resistance, the heat generation, and the thermal capacity, to the calculation unit 12 as the correction information Cc. The temperature calculation unit 30 of the calculation unit 12 corrects at least one of a thermal resistance, a heat generation, and a thermal capacity in the thermal circuit model 30-1 using the correction information Cc.

Next, advantageous effects of the present embodiment are described.

As described above, the control device 10 includes the calculation unit 12 that performs temperature estimation using the measurement information of the sensors 8 and the thermal circuit model 30-1, and the correction unit 13 that corrects at least one of the thermal resistance, the heat generation, and the thermal capacity in the thermal circuit model 30-1.

It is assumed here that the thermal resistance, the heat generation, and the thermal capacity are fixed by the time of writing logic into the control device 10 in the production process of the motor 1 and are not changed after the factory shipment. In a conventional control device that estimates the motor temperatures, the thermal resistances, the heat generations, and the thermal capacities in the thermal circuit model for all the individual motor 1 products are set at the same values regardless of the product-to-product variation in the production processes of the motors 1, so that the errors between the actual values in a motor 1 and set values in the thermal circuit model can be significantly large due to the product-to-product variation of the values, the actual and the set values here being the values of the thermal resistances, the heat generations, and the thermal capacities. Then the degradation of the temperature estimation accuracy is expected.

The thermal resistance is (Length of thermal flow path)/{(Cross-sectional area of thermal flow path) (Thermal conductivity of parts and materials of the motor 1)}. (Thermal conductivity of parts and materials of the motor 1) is a physical property of parts and materials of the motor 1 and is expected to change due to aging deterioration.

The heat generation due to copper loss in the winding of the motor 1 is (Winding resistance)×(Square of winding current). The heat generation due to iron loss in the rotor core 6 or the stator core 4 is {Square of ((Magnetic flux density)×(Cross-sectional area of magnetic path)×(Frequency of magnetic flux density))}×(Proportional coefficient). (Winding resistance) and (Magnetic flux density) are physical properties of a winding with a core, and are expected to change due to aging deterioration.

The thermal capacity is (Specific heat of parts and materials)×(Mass). (Specific heat of parts and materials) is a physical property of parts and materials and is expected to change due to aging deterioration.

In case where at least one of the thermal resistance, the heat generation, and the thermal capacity of the actual motor 1 changes due to aging deterioration, the correction unit 13 of the control device 10 according to the present embodiment is able to correct the thermal resistance, the heat generation, or the thermal capacity of the thermal circuit model 30-1 which corresponds to the changed one of at least one of the thermal resistance, the heat generation, and the thermal capacity in the actual motor 1. Therefore, the accuracy of the temperature estimation can be improved compared with the conventional control devices that estimate the motor temperatures.

The correction unit 13 makes a correction when the error between the estimated temperature T33 estimated by the calculation unit 12 and the measured temperature at the position of the estimated temperature T33 is equal to or greater than the preset threshold. The threshold is set according to the required accuracy for the temperature estimation, so that a certain practical level of accuracy of the temperature estimation can be ensured. The accuracy of the temperature estimation can be adjusted by changing the threshold if necessary.

In case where the same thermal resistance initial values, the same heat generation initial values, and the same thermal capacity initial values are set for the thermal circuit model 30-1 in all the motor 1 products at the time of their shipment from their factory, it is possible to improve the accuracy of the temperature estimation by correcting a thermal resistance, a heat generation, or a thermal capacity in the thermal circuit model 30-1 according to the product-to-product variations of the thermal resistances, the heat generations, or the thermal capacities of the actual motors 1. It is also possible to improve the accuracy of the temperature estimation by a control device 10 correcting a thermal resistance, a heat generation, or a thermal capacity of its own motor 1 product from the factory initial value at the time of the operation test of the motor 1 before the shipment.

The correction unit 13 corrects the value R of the thermal resistance 21 by solving Equation (2) for the partial thermal circuit model 30-2a using the measured temperatures obtained by two temperature sensors 31. That is, the correction unit 13 can calculate the correction information Cc to correct the value R of the thermal resistance 21 from only the measurement information obtained by two temperature sensors 31 provided near the thermal resistance 21.

The correction unit 13 corrects the heat generation Q by solving Equation (5) for the partial thermal circuit models 30-2b and 30-2c using the measured temperatures obtained by three temperature sensors. That is, the correction unit 13 can calculate the correction information Cc to correct the heat generation Q from only the measurement information obtained by three temperature sensors 31 provided near the heat source 22. The correction unit 13 can calculate the correction information Cc to correct the heat generation Q by measuring two thermal flows. That is, the correction unit 13 can calculate the correction information Cc to correct the heat generation Q near the sensors 8 from the measurement information obtained by two thermal flux sensors 32.

The way to correct the thermal resistance, the heat generation, and the thermal capacity is not limited to those described above, and it is possible to adopt another way to solve the equations for the partial thermal circuit models including the sensors 8 using the measurement information obtained by sensors 8. Therefore, the equations to be used for the correction is not limited to the equations (2), (5), and (6), but can be equations representing other appropriate thermal circuit models.

The requirement for the sensors 8 to be used for the correction is to measure the temperatures and/or the thermal flows required to solve the equations for the partial thermal circuit models for the correction. Then, a sensor 8 can be a combination of the temperature sensors 31 and the thermal flux sensors 32. For example, the measurement information to be used for Equation (5) in case of correcting the heat generation can be a combination of (T1, T4, U2) etc. instead of the combination (T1, T4, T2) or (U1, U2). Therefore, the thermal resistance, the heat generation, or the thermal capacity at a required position can be corrected by changing the type of the sensor 8 or the measurement position.

Also, the correction of the thermal resistance, the heat generation, or the thermal capacity is performed not only when the motor 1 is not working but also when the motor 1 is producing torque, as described before. During the time the motor 1 is producing torque, the temperature of the entire motor 1 rises and a thermal conductivity therein varies. This leads to the change of the value of the thermal resistance represented by (Length of thermal flow path)/{(Cross-sectional area of thermal flow path) (Thermal conductivity of parts and materials of the motor 1)}.

During the time the motor 1 is producing torque, the winding current flowing through the stator winding 5 raises the overall temperature of the motor 1, which in turn changes the winding resistance, the value of the electrical resistance of the stator winding 5. Therefore, the heat generation at the stator winding 5, which is represented by (Winding resistance)×(Square of Winding current), also changes.

Since the thermal capacity has its temperature dependence, the thermal capacity changes according to the changes of the temperature. Therefore, the accuracy of the temperature estimation for the motor 1 is expected to deteriorate in a case where the overall temperature of the motor 1 rises during the time the motor 1 is producing torque.

Even in a case of the above-described situation, the accuracy of the temperature estimation for the motor 1 can be improved when its temperature rises during the time the motor 1 is producing torque by correcting the thermal resistances, the heat generations, or the thermal capacities.

Embodiment 2

Figure 10:
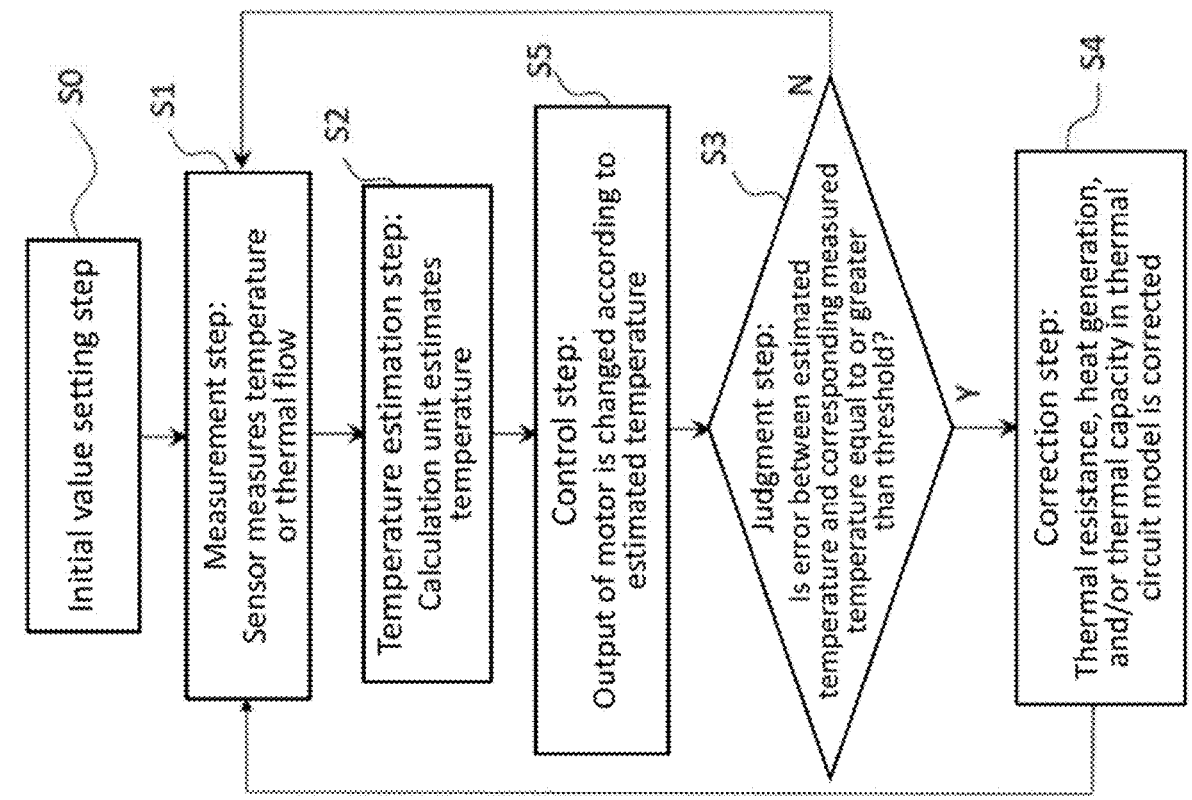
FIG. 10 is a flow chart of a control process performed by a control device according to Embodiment 2 of this application.
Figure 11:
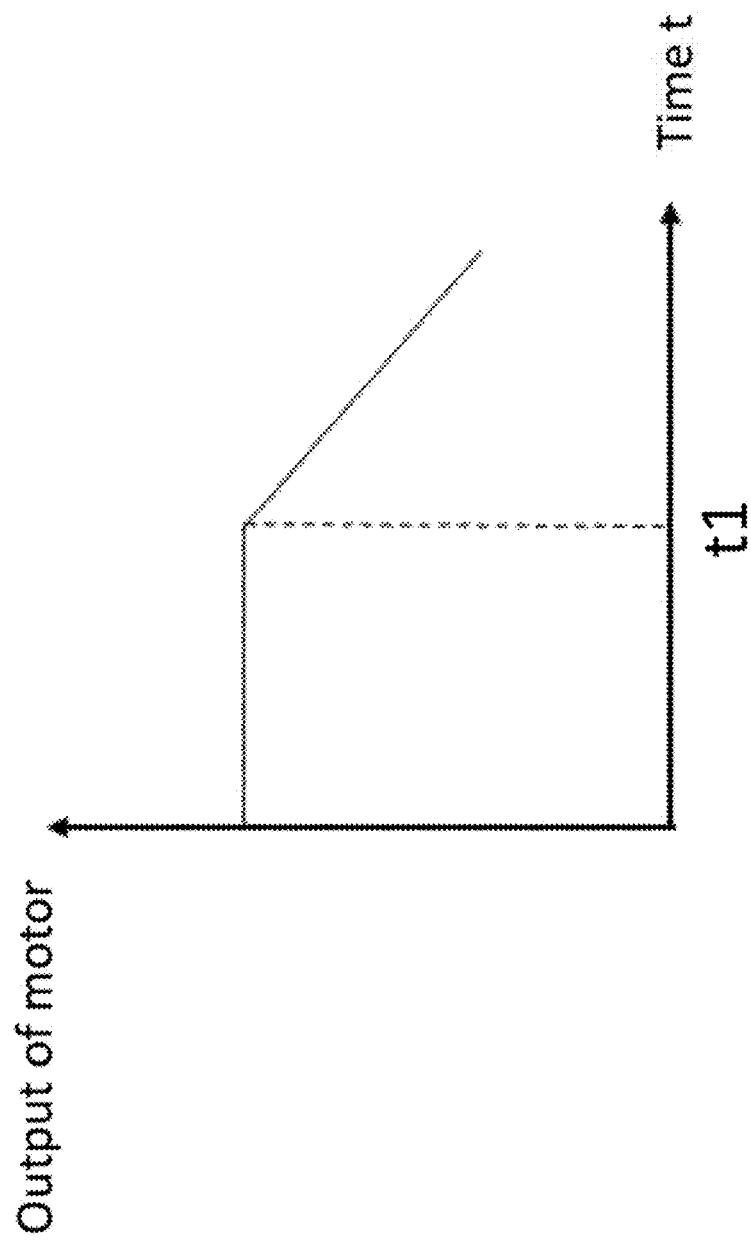
FIG. 11 is a diagram showing the motor output against time when the motor is under control of the control device according to Embodiment 2 of this application.
Figure 12:
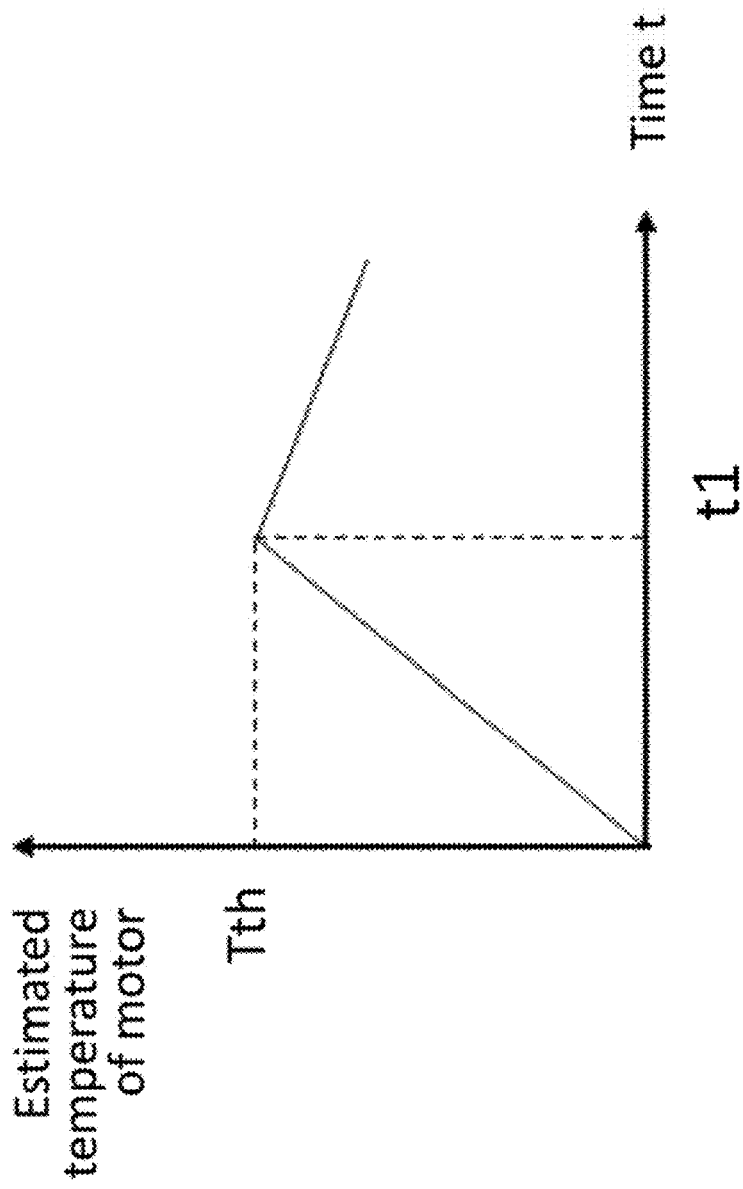
FIG. 12 is a diagram showing estimated temperature against time when the motor is under control of the control device according to Embodiment 2 of this application.
Figure 13:
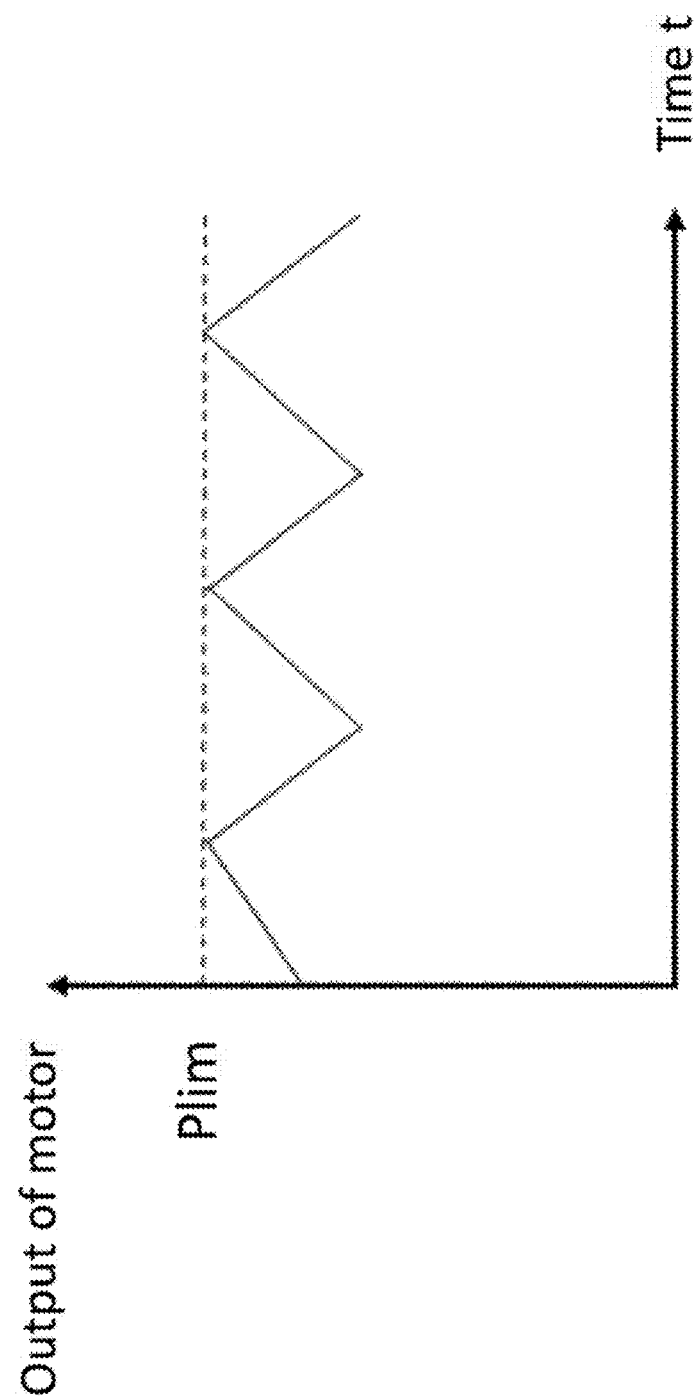
FIG. 13 is a diagram showing the motor output against time when the motor is under control of the control device according to Embodiment 2 of this application.
Figure 14:
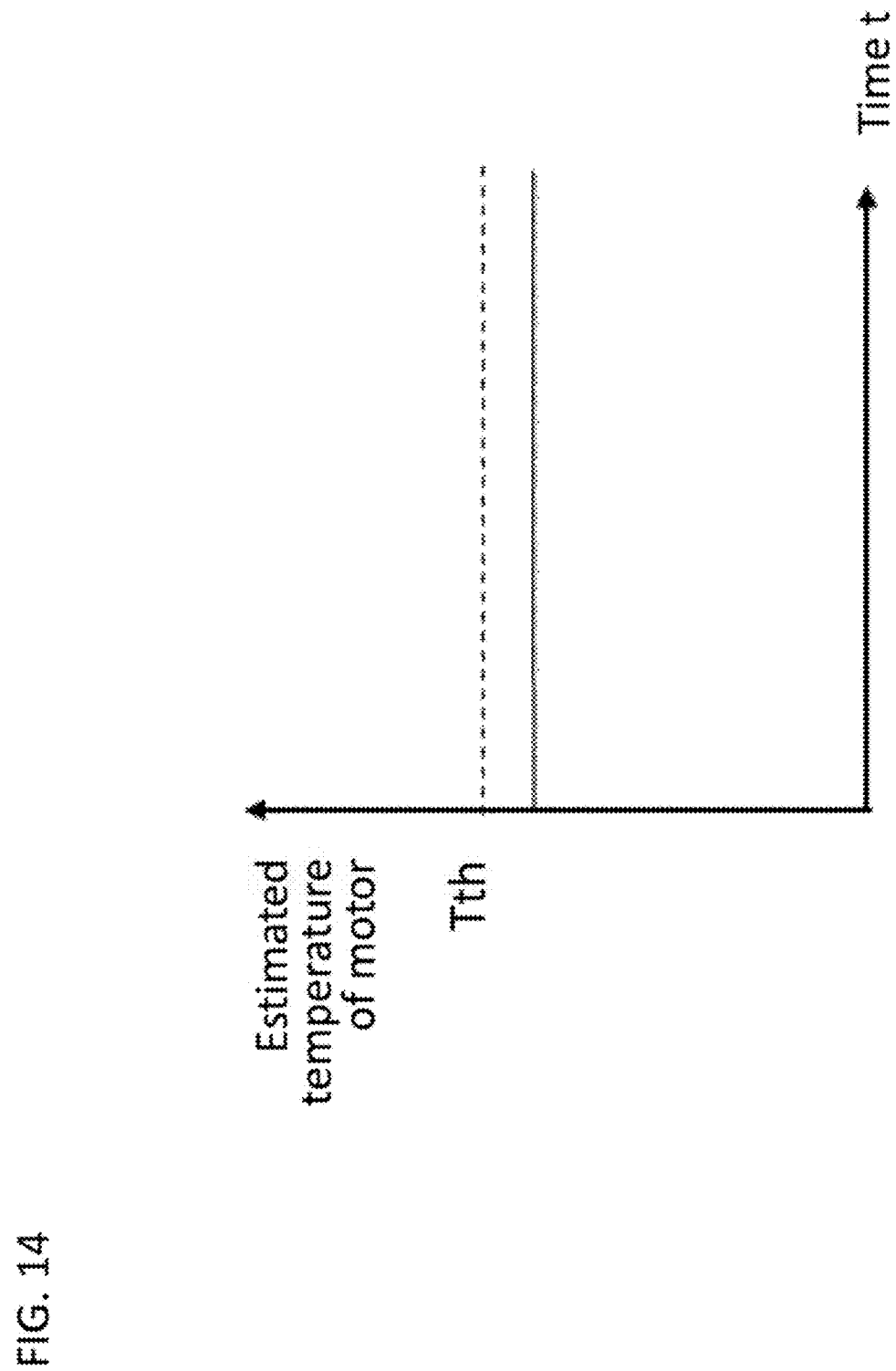
FIG. 14 is a diagram showing estimated temperature against time when the motor is under control of the control device according to Embodiment 2 of this application.

FIG. 10 is a flow chart of a control process performed by a control device according to Embodiment 2 of the present invention disclosed in this application. FIG. 11 is a diagram showing the motor output against time when the motor is under control of the control device according to the present embodiment. FIG. 12 is a diagram showing estimated temperature against time when the motor is under control of the control device according to the present embodiment. FIG. 13 is a diagram showing the motor output against time when the motor is under control of the control device according to the present embodiment. FIG. 14 is a diagram showing estimated temperature against time when the motor is under control of the control device according to the present embodiment. In FIGS. 10, 11, 12, 13 and 14, the control device 10a according to the present embodiment differs from the control device 10 according to Embodiment 1 in the following points.

After the temperature estimation step S2 is performed in FIG. 10, the control unit 11 sends, in the control step S5, a control command to the inverter 9 to change the output of the motor 1 according to the estimated temperature T33 of the motor 1, which is estimated by the calculation unit 12 in the temperature estimation step S2, which is the same as that in FIG. 9, as it is estimated in Embodiment 1. After the control unit 11's control of the output of the motor 1 in the control step S5, the correction judgment unit 34 of the correction unit 13 compares, as it does in Embodiment 1, the estimated temperature T33 obtained by the calculation unit 12 with the measured temperature T31 of the same position as the estimated temperature T33 in the judgment step S3, which is the same as that in FIG. 9, and send its output of the correction instruction Dc, which is an instruction of the correction, as a correction trigger in case where the error ε between the estimated temperature T33 and the measured temperature T31 is equal to or greater than a preset threshold. In case where the error ε is below the preset threshold, the active step returns to the measurement step S1 to then the step S1 and the temperature estimation step S2 followed by the judgment step S3 are repeated again and again until the error ε becomes equal to or greater than the preset threshold. The processing steps of the correction step S4 and thereafter are the same as those of Embodiment 1.

Next, the control of the output of the motor 1 performed in the control step S5 is described.

In FIG. 11, the horizontal axis represents the time t, and the vertical axis represents the output of the motor 1. In FIG. 12, the horizontal axis represents the time t, and the vertical axis represents the estimated temperature T33 of the motor 1. As shown in FIGS. 11 and 12, when the estimated temperature T33 exceeds the preset threshold Tth at time t1, the control unit 11 lowers or stops the output of the motor 1 so as for the estimated temperature T33 to go down. This control makes it possible to lower the estimated temperature T33 to be the threshold Tth or below.

In FIG. 13, the horizontal axis represents the time t, and the vertical axis represents the output of the motor 1. In FIG. 14, the horizontal axis represents the time t, and the vertical axis represents the estimated temperature T33 of the motor 1. As shown in FIGS. 13 and 14, the control unit 11 can make the motor 1 work with its output kept at Plim or lower by limiting it so as for the estimated temperature T33 to be kept at threshold Tth or lower.

Next, advantageous effects of the present embodiment are described.

The control device 10 of the motor system 100 according to the present embodiment is provided with the control unit 11 that changes the way the motor 1 works according to the estimated temperature T33 estimated by the calculation unit 12. Specifically, the control unit 11 controls the voltage to be applied to the motor 1 through the inverter 9 according to the estimated temperature. By this, the motor 1 can be prevented from overheating by lowering or stopping the output of the motor 1 so as for the temperature at the same point as the estimated temperature T33 not to reach or exceed the threshold Tth in case the estimated temperature T33 is high. Also, the control unit 11 is able to realize the maximum allowed output of the motor 1 while keeping the estimated temperature T33 at the threshold Tth or lower by limiting the output of the motor 1 to work within the limit so as for the estimated temperature T33 to be kept close to the threshold Tth.

Also, during the time the motor 1 is producing torque, the control unit 11 controls the output of the motor 1 by controlling the voltage to be applied to the motor 1 through the inverter 9 according to the estimated temperature T33. By this, the accuracy of the temperature estimation for the motor 1 can be improved like Embodiment 1 when its temperature rises during the time the motor 1 is producing torque by correcting the thermal resistances, the heat generations, or the thermal capacities.

DESCRIPTION OF THE SYMBOLS

1 . . . motor (rotating electric machine),
2 . . . stator,
3 . . . rotor,
4 . . . stator core,
5 . . . stator winding,
6 . . . rotor core,
7 . . . rotor winding,
8 . . . sensor,
9 . . . inverter (power converter),
10, 10a . . . control device,
11 . . . control unit,
12 . . . calculation unit,
13 . . . correction unit,
14 . . . rotational position detector,
15 . . . current detector,
20, 20a, 20b, 20c, 20d, 20e, 20f, 20g . . . node,
21 . . . thermal resistance,
22, 22a . . . heat source,
23 . . . shaft,
24, 24a1, 24a2 . . . thermal capacity,
30 . . . temperature calculation unit,
30-1 . . . thermal circuit model,
30-2, 30-2a, 30-2b, 30-2c . . . partial thermal circuit model,
31, st2 . . . temperature sensor,
32, sf1, sf3 . . . thermal flux sensor,
34 . . . correction judgment unit,
35 . . . correction calculation unit,
90 . . . processor,
91 . . . storage device,
100 . . . control system (motor system).

The invention claimed is:

1. A control device comprising
correction circuitry to correct at least one of a thermal resistance, a value of heat generation, and a thermal capacity, which are physical quantities to build a thermal circuit model covering a thermal circuit of a rotating electric machine,
wherein the correction circuitry corrects at least one of the thermal resistance, the value of heat generation, and the thermal capacity at a measurement position by using measurement information including temperature or thermal flow measured by sensing circuitry at the measurement position in the rotating electric machine, and by using the thermal circuit model including the measurement position.

2. The control device according to claim 1, further comprising
calculation circuitry to estimate a temperature of the rotating electric machine as an estimated temperature using the thermal circuit model,
wherein the sensing circuitry measures, as a measured temperature, a temperature at a measurement position where the estimated temperature is obtained, and
wherein the correction circuitry corrects at least one of the thermal resistance, the value of heat generation, and the thermal capacity at the measurement position in case where the absolute value of the difference between the estimated temperature and the measured temperature is equal to or greater than a predetermined threshold.

3. The control device according to claim 2, further comprising
control circuitry to control the rotating electric machine using the thermal circuit model,
wherein the control circuitry controls the voltage to be applied to the rotating electric machine through a power converter according to the estimated temperature.

4. The control device according to claim 2, further comprising
control circuitry to control the rotating electric machine using the thermal circuit model,
wherein, during the time the rotating electric machine is producing torque, the control circuitry controls the output of the rotating electric machine by controlling the voltage to be applied to the rotating electric machine through a power converter according to the estimated temperature.

5. The control device according to claim 1,
wherein the sensing circuitry measures a first measured temperature and a second measured temperature and a first measured thermal flow, the first measured temperature being a temperature at a first measurement position, the second measured temperature being a temperature at a second measurement position, the first measurement position and the second measurement position being two different measurement positions in the rotating electric machine, the first measured thermal flow being the thermal flow flowing from the first measurement position to the second measurement position, and
wherein the correction circuitry corrects the thermal resistance between the first measurement position and the second measurement position using the first measured thermal flow and a difference between the first measured temperature and the second measured temperature.

6. The control device according to claim 1,
wherein the sensing circuitry measures a first measured thermal flow and a second measured thermal flow, the first measured thermal flow being a thermal flow at a first measurement position, the second measured thermal flow being a thermal flow at a second measurement position, the first measurement position and the second measurement position being two different measurement positions in the rotating electric machine, and
wherein the correction circuitry corrects the value of heat generation which flows into or flows out of a position between the first measurement position and the second measurement position using a difference between the first measured thermal flow and the second measured thermal flow.

7. The control device according to claim 1,
wherein the sensing circuitry measures a first measured temperature, a second measured temperature, and a third measured temperature, the first measured temperature being a temperature at a first measurement position, the second measured temperature being a temperature at a second measurement position, the third measured temperature being a temperature at a third measurement position, these three measurement positions being three different measurement positions in the rotating electric machine, and
wherein the correction circuitry corrects the value of heat generation which flows into or flows out of the second measurement position using the first measured temperature, the second measured temperature, the third measured temperature, and a first thermal resistance between the first measurement position and the second measurement position, and a second thermal resistance between the second measurement position and the third measurement position.

8. The control device according to claim 1,
wherein the sensing circuitry measures a measured temperature rise, a first measured thermal flow a second measured thermal flow and a third measured thermal flow the measured temperature rise being a temperature rise per unit time at a first measurement position, the first measurement position being a measurement position in the rotating electric machine, the first measured thermal flow, the second measured thermal flow, and the third measured thermal flow being three of four thermal flows which flow into or flow out of the first measurement position, the thermal flow that is one from among the four thermal flows and which is different from the three measured thermal flows being called a first thermal flow, and
wherein the correction circuitry corrects the thermal capacity where the first thermal flow passes through using the first measured thermal flow, the second measured thermal flow, the third measured thermal flow, and the measured temperature rise.

9. The control device according to claim 1, wherein, by using measured temperatures measured by the sensing circuitry provided in the rotating electric machine, the correction circuitry corrects at least one of the thermal resistance, the value of heat generation, and the thermal capacity for each of measurement positions, the measurement positions being positions where the measured temperatures are measured by the sensing circuitry.

10. A control system comprising the control device and the sensing circuitry according to claim 1.

* * * * *